H. W. JACOBS.
MACHINE FOR TURNING CRANKED AXLES.
APPLICATION FILED MAY 25, 1907.
899,536.
Patented Sept. 29, 1908.
3 SHEETS—SHEET 1.
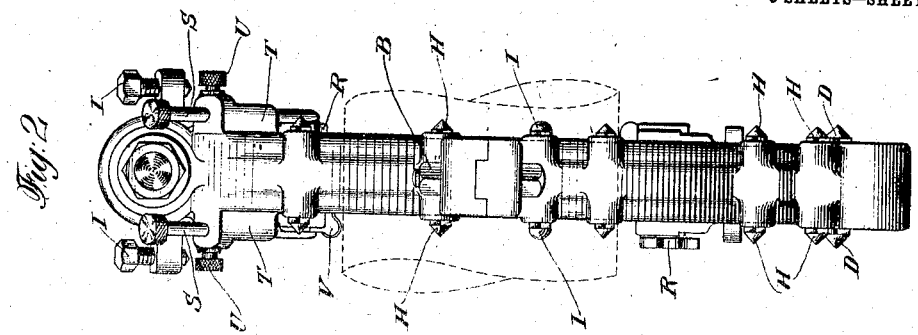
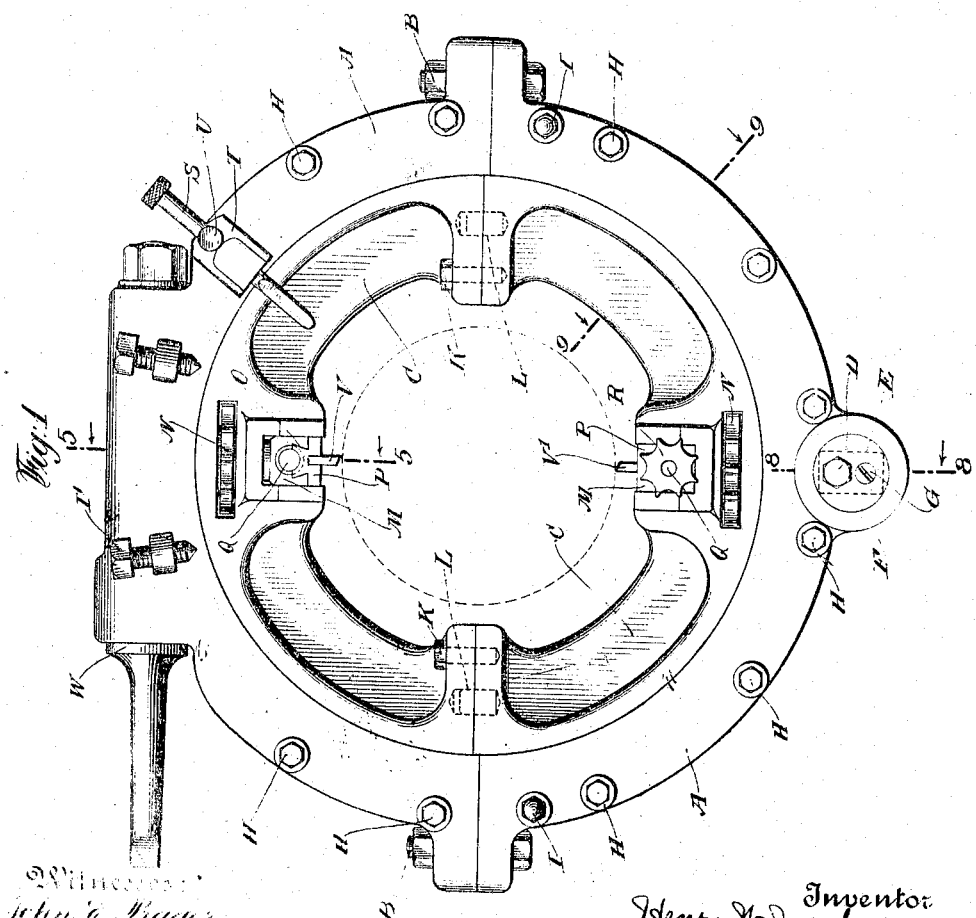

H. W. JACOBS.
MACHINE FOR TURNING CRANKED AXLES.
APPLICATION FILED MAY 25, 1907.
899,536.
Patented Sept. 29, 1908.
3 SHEETS—SHEET 2.
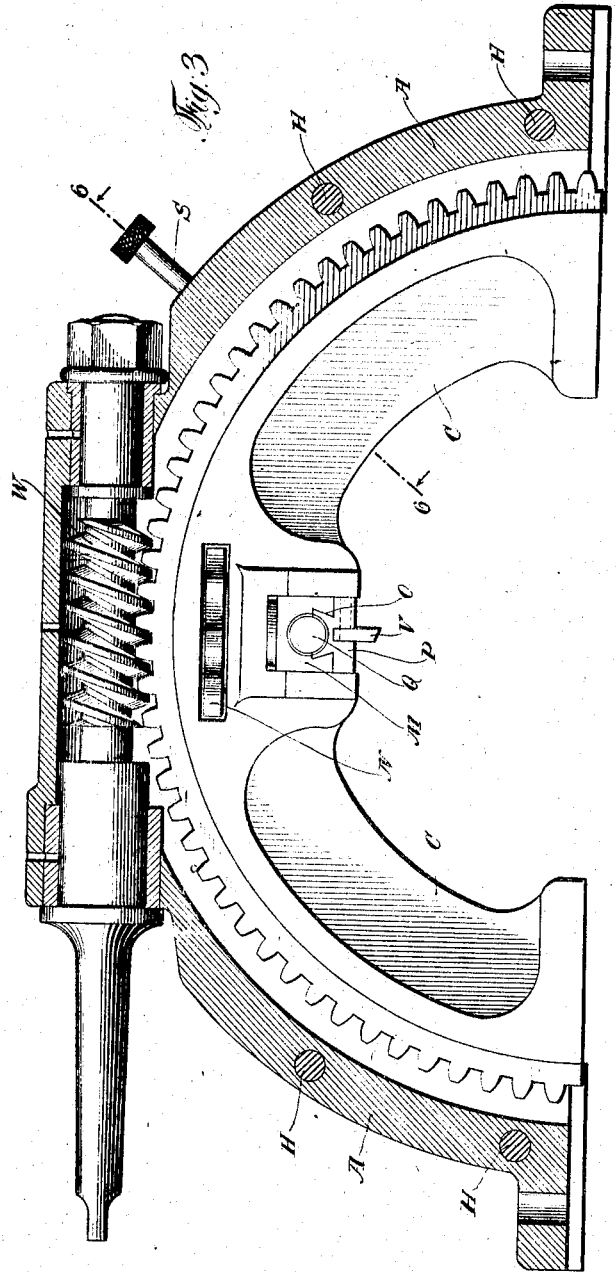
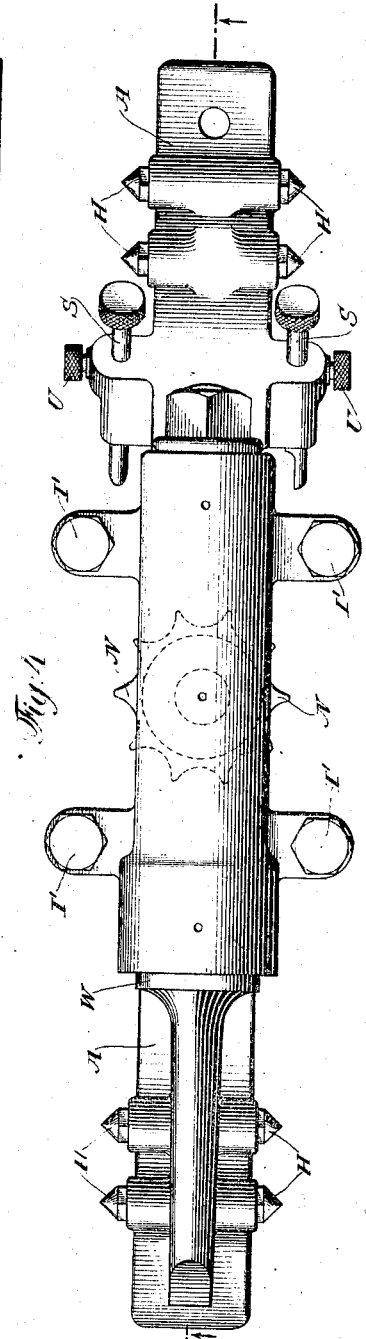
Witnesses:
John E. Prager
Isabel Pearse
Inventor
Henry W. Jacobs,
By his Attorneys
Prindle and Williamson

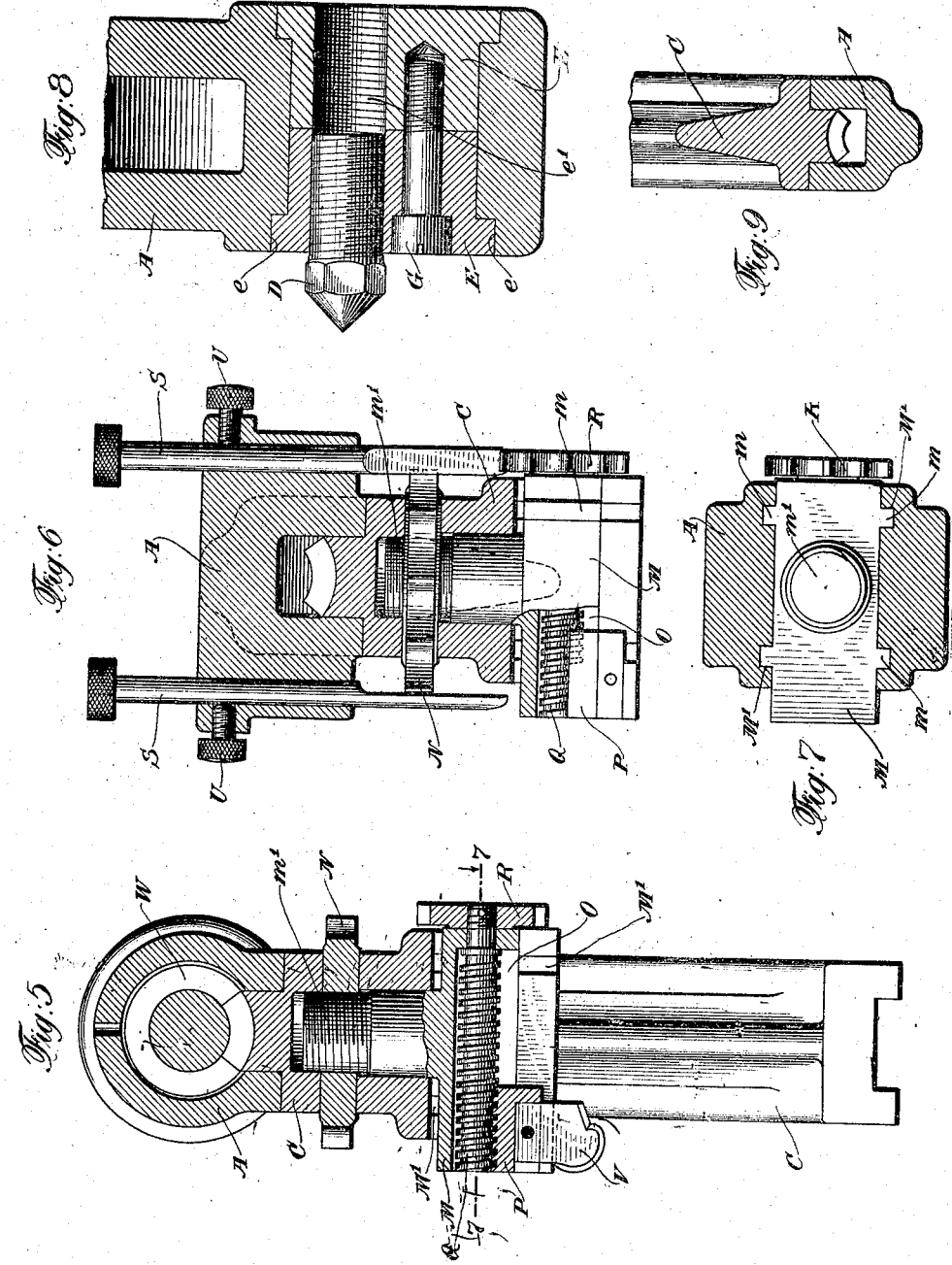

UNITED STATES PATENT OFFICE.

HENRY WILLIAM JACOBS, OF TOPEKA, KANSAS.

MACHINE FOR TURNING CRANKED AXLES.

No. 899,536.

Specification of Letters Patent.

Patented Sept. 29, 1908.

Application filed May 25, 1907. Serial No. 375,681.

*To all whom it may concern:*

Be it known that I, HENRY WILLIAM JACOBS, of the city of Topeka, in the county of Shawnee and in the State of Kansas, have invented a certain new and useful Improvement in Machines for Turning Cranked Axles, and do hereby declare that the following is a full, clear, and exact description thereof, reference being had to the accompanying drawings, in which—

Figure 1 is a side elevation of a machine embodying my invention; Fig. 2 is an end view of Fig. 1; Fig. 3 is a longitudinal sectional view of the upper half of Fig. 1; Fig. 4 is a plan view of Fig. 1; Fig. 5 is a view on the line 5—5 of Fig. 1; Fig. 6 is a view on the line 6—6 of Fig. 3; Fig. 7 is a view on the line 7—7 of Fig. 5; and Figs. 8 and 9 are views on the lines 8—8 and 9—9, respectively, of Fig. 1.

The object of my invention has been to provide a machine for turning the crank pins of cranked axles which shall have, among others, the following advantages; that of having an automatic cross-feed and an automatic radial feed, either or both of which may be worked at a given time, as desired; that of enabling the same machine to turn crank pins on cranks of different radii; that of enabling the machine to be readily and accurately clamped to the axles, and that of being portable and so compact that it can be applied to the cranked axle of a locomotive without removing the axle from the locomotive, and to such ends my invention consists in a machine for turning the cranked axles hereinafter specified.

My machine is intended for turning cranked pins in any form of cranked axle, but especially of cranked axles for locomotives, such as built-up axles with elliptical or circular disks formed on or secured to the axles and having the crank pins mounted between the disks, or axles built up with a combination of circular disks and a zig-zag bar as a center-piece known as the "semi-Z" axle, or one-piece crank axles, etc.

In that embodiment of my invention which I have chosen for illustration, an annular frame A is provided, which frame is made in two parts divided along its horizontal diameter, the parts being screwed together by bolts B. Within this frame is rotatively mounted a tool carrier C to be more fully described. In order to position the frame A and therefore the path of revolution of the tool, such frame is provided with a number of set screws which are adapted to be spread apart and to engage the cheeks of the crank.

In order that the crank pin may be turned at exactly the desired radius from the axle center, the frame A is provided with set screws in line with each other and projecting from opposite sides of the frame, the said set screws being adapted to be screwed out from the frame and forced into the counter sunk centers found in all built-up axles of this class, but which centers must be located on cranked axles of the one-piece type. In order that the same machine may be capable of turning crank pins at different radii from the said centers, the set screws D are mounted in pieces E having rectangular shanks which fit in a rectangular hole F in the frame A; the pieces E are provided with flanges e to fit against the faces of the frame, and the said pieces are secured together in the frame by a screw G. The pieces E have threaded sockets e' in which the said screws D may be seated, and as such sockets are formed nearer one end of the pieces E than the other end, i. e., eccentrically to the rectangular shanks of the said pieces, the said pieces can be removed from the frame and reversed and put back in the socket F, thereby throwing the said screws D nearer to or farther from the center of the path of the tool, and permitting the tool to be used for two different radii of crank with a single set of pieces E.

A series of sharp pointed set screws H project from the sides of the frame A and can be screwed out against the cheeks of the cranked axle, the frame A is also provided with round headed set screws I, and this can be used to position the frame laterally between the cheeks of the cranked axle, while permitting the frame to be moved in its plane, after which the sharp pointed set screws can be screwed out against the said cheeks. It is also provided with pointed set screws I' radially mounted in lugs formed on the frame, which can be screwed against the heads of the crank arms or disks.

The tool carrier C is made in halves, connected by screws K and dowel pins L. In each half of the carrier there is mounted a tool having a compound feed; the said feeds being alike, so that the description of one will be sufficient for both.

There is a tool holder M mounted in a radially disposed guide, there being ribs m formed on the holder and engaging slots in the said guide to insure more perfect motion. The holder M has a threaded shank n' which extends radially and has a threaded engagement with a star-wheel N, mounted in a slot in the tool carrier. The holder M has a horizontal guide-way O in which is mounted a tool slide P, the slide being movable by means of a feed screw Q. The feed screw carries a star-wheel R.

For the purpose of operating either one or both of the star wheels N and R automatically upon the rotation of the tool carrier, pins S are mounted in radial sockets T formed on the frame, the said pins being secured in said sockets by means of thumb-screws U. The pins S are flattened upon one side at their point, and they can be made to operate the star wheels N by turning the unflattened or rounded side of the pin toward said wheels, and can be made to operate the star wheels R, or not according as they are moved toward or from the center, sufficiently to engage or not engage said wheels. The star wheels are mounted upon opposite sides of the frame A, and there are two pins S, one on each side of the frame, so that each pin can only engage one of said star wheels, and thus either one or both of the tools V and V', respectively, can be fed.

In order to cause the rotation of the tool carrier in the frame A, a worm W is journaled in bearings in the frame and engages the worm wheel formed on the periphery of the carrier.

In the operation of my machine, the frame and tool carrier are taken to pieces and the parts of the carrier are assembled around the crank pin; the parts of the frame are then assembled around the carrier; the set screws D are then screwed into the centers in the crank cheeks; and the round-headed set screws I are screwed out against the crank cheeks until the frame A is in a plane perpendicular to the axle. The frame is then properly positioned in its plane and is then secured in such position by the said screws I', after which the frame is finally secured in position by screwing out the point of set screws H against the crank cheeks. The two tools V and V' facing in opposite directions are started at the middle of the cut and the said tools are driven in opposite directions by the engagement of their respective pins S with their respective star wheels R. When it is desired to feed the tools toward the center of the crank, the pins S are turned so that their rounded surfaces engage the wheels N, causing a feeding inward of the shanks n'. If desired, a tapering cut can be made by permitting the pins S to engage both the star wheels N and the star wheels R at the same time; the tools thus being given both a radial and an axial movement at the same time.

It is obvious that various changes can be made in the above illustrated construction, which will embody the principles of the invention, and it is desired that the claims be given the broadest interpretation of which they are capable, consistent with the prior art.

I claim:—

1. In a machine for turning cranked axles, the combination of a frame, a tool carrier rotatably mounted in said frame, a radially movable tool holder, an axially movable tool slide mounted on said holder, and automatic means adjustable to feed either said holder or said slide, as may be desired.

2. In a machine for turning cranked axles, the combination of a frame, a tool carrier rotatably mounted in said frame, and axially movable set screws mounted on opposite sides of said frame, and adapted to engage the cheeks of a cranked axle.

3. In a machine for turning cranked axles, the combination of a frame, a tool carrier rotatably mounted in said frame, and axially movable set screws mounted on opposite sides of said frame, and adapted to engage the cheeks of a cranked axle, some of said screws having round noses and others of them being pointed.

4. In a machine for turning cranked axles, the combination of a frame, a tool carrier rotatably mounted in said frame, axially movable set screws mounted on said frame, and adapted to engage the cheeks of a cranked axle, and radially adjustable set screws mounted in said frame.

5. In a machine for turning cranked axles, the combination of a frame, a tool carrier rotatably mounted in said frame, blocks reversibly mounted in said frame outside the path of rotation of the tools, and pointed set screws mounted eccentrically in said blocks and projecting substantially parallel with the axis of rotation, whereby the machine can be adapted for cranks of different radii.

6. In a machine for turning cranked axles, the combination of a frame, a tool carrier rotatably mounted in said frame, blocks reversibly mounted in said frame outside the path of rotation of the tools, and pointed set screws mounted eccentrically in said blocks and projecting substantially parallel with the axis of rotation, said blocks having rectangular shanks adapted to be reversibly fitted into a socket in said frame, flanges on said blocks, and a screw for drawing said flanges against the opposite faces of said frame, whereby the machine can be adapted for cranks of different radii.

7. In a machine for turning cranked axles, the combination of a frame, a tool carrier rotatably mounted in said frame, a tool holder radially mounted in said carrier, a star-wheel and screw for moving said holder, a tool slide axially mounted on said holder, a star-wheel and screw for rotating said slide, and a pin so mounted on the frame as to be radially adjustable and adapted to engage said star-wheels.

8. In a machine for turning cranked axles, the combination of a frame, a tool carrier rotatably mounted in said frame, a tool holder radially mounted in said carrier, a star-wheel and screw for moving said holder, a tool slide axially mounted on said holder, a star-wheel and screw for rotating said slide, and a pin so mounted on the frame as to be radially adjustable and adapted to engage said star-wheels, said pin being flattened upon one side so as to be capable of being turned to pass said first mentioned wheel without turning it.

9. In a machine for turning cranked axles, the combination of a frame, a tool carrier rotatably mounted in said frame, diametrically opposite tool holders radially mounted in said carrier, a screw and star-wheel for moving each of said holders, an axially movable slide mounted on each of said holders, a screw and star-wheel for moving each of said slides, the last mentioned star wheels being upon opposite sides of the frame, and radially-movable adjustable pins mounted upon said frame, said pins being on opposite sides of the frame, and each of said pins being capable of engaging one of said last mentioned star-wheels.

10. In a machine for turning cranked axles, the combination of a frame, a tool carrier rotatably mounted in said frame, diametrically opposite tool holders radially mounted in said carrier, a screw and star-wheel for moving each of said holders, an axially movable slide mounted on each of said holders, a screw and star-wheel for moving each of said slides, the last mentioned star-wheels being upon opposite sides of the frame, and radially movable adjustable pins mounted upon said frame, said pins being on opposite sides of the frame, and each of said pins being capable of engaging one of said last mentioned star-wheels, and being flattened on one side so as to engage or not engage one of said first mentioned star-wheels, as desired.

In testimony that I claim the foregoing I have hereunto set my hand.

HENRY WILLIAM JACOBS.

Witnesses:
  Wm. J. Leighty,
  H. H. Lanning.